(12) United States Patent
Mori et al.

(10) Patent No.: US 8,705,958 B2
(45) Date of Patent: Apr. 22, 2014

(54) OPTICAL PACKET SWITCHING APPARATUS, OPTICAL PACKET SWITCHING SYSTEM, AND OPTICAL PACKET IN-LINE AMPLIFIER APPARATUS

(75) Inventors: Shota Mori, Kawasaki (JP); Reiko Sato, Kawasaki (JP)

(73) Assignee: Fujitsu Telecom Networks Limited (JP)

( * ) Notice: Subject to any disclaimer, the term of this patent is extended or adjusted under 35 U.S.C. 154(b) by 255 days.

(21) Appl. No.: 13/046,599

(22) Filed: Mar. 11, 2011

(65) Prior Publication Data

US 2012/0148239 A1    Jun. 14, 2012

(30) Foreign Application Priority Data

Dec. 9, 2010  (JP) ................. 2010-274289

(51) Int. Cl.
  *H04J 14/00*  (2006.01)
  *H04L 12/56*  (2011.01)
  *H01S 3/00*  (2006.01)

(52) U.S. Cl.
  USPC ............. 398/43; 398/30; 398/38; 398/83

(58) Field of Classification Search
  USPC ................... 398/19, 30–33, 38, 45
  See application file for complete search history.

(56) References Cited

U.S. PATENT DOCUMENTS

2006/0285846 A1* 12/2006 Uekama et al. ............. 398/30
2007/0109630 A1*  5/2007 Komaki et al. ......... 359/341.44
2007/0223921 A1*  9/2007 Sone et al. ............... 398/45

FOREIGN PATENT DOCUMENTS

| JP | 2000-294858 A | 10/2000 |
| JP | 2002-350791 A | 12/2002 |
| JP | 2006-238368 A |  9/2006 |
| JP | 2008-235986   | 10/2008 |

OTHER PUBLICATIONS

Awaji, Yoshinari, et al., Amplification of optical packet on WDM considering change of traffic density an implementation of burst-mode EDFA, Institute of Electronics, Information, and Communication Engineers, NTI-Electronic Library Service, pp. 35-40, Oct. 16, 2008.
Awaji, Yoshinari, et al., Structural approach of customized EDFA for optical packets, Institute of Electronics, Information, and Communication Engineers, NTI-Electronic Library Service, pp. 31-36, Jun. 7, 2007.
Japanese Office action with English Machine Translation for Patent Application No. 2010-274289, dated Dec. 17, 2013, 6 pages.

* cited by examiner

*Primary Examiner* — Oommen Jacob
(74) *Attorney, Agent, or Firm* — Christie, Parker & Hale, LLP

(57) ABSTRACT

An optical packet switching apparatus includes (i) an optical packet switch for switching the route of an inputted optical packet signal and outputting the inputted optical packet signal, (ii) an input-side packet density monitoring unit for detecting the packet density of optical packet signals inputted to the optical packet switch, (iii) a first input-side optical amplifier provided on an input side of the optical packet switch, (iv) a first input-side variable optical attenuator (VOA) provided posterior to the optical amplifier, (v) a storage for storing the gain characteristics in relation to the packet density at the first input-side optical amplifier, and (vi) an input-side VOA control unit for controlling the attenuation by the first input-side VOA in such a manner as to compensate for the gain fluctuations due to the variations in the packet density at the first input-side optical amplifier, based on the packet density and the gain characteristics.

20 Claims, 8 Drawing Sheets

OPTICAL PACKET SWITCHING APPARATUS, OPTICAL PACKET SWITCHING SYSTEM, AND OPTICAL PACKET IN-LINE AMPLIFIER APPARATUS

CROSS-REFERENCE TO RELATED APPLICATION(S)

This application claims priority to and the benefit of Japanese Patent Application Number 2010-274289, filed on Dec. 9, 2010.

BACKGROUND OF THE INVENTION

1. Field of the Invention

The present invention relates to an optical packet switching system which enables packet switching for each optical packet by switching an optical switch according to routing information given to an optical packet signal.

2. Description of the Related Art

In optical transmission systems employing wavelength division multiplexing (WDM), a technique that performs the path switching per wavelength by the use of a wavelength selective switch (WSS) and the like is put to practical use. As a technology that may succeed this technique, an optical packet switching method is now being investigated. In this optical packet switching method, an IP packet (10 GEther (10 Gigabit Ethernet (registered trademark) signal and the like), for example, is used as a small unit with which the switching is performed, and each is converted into the form of an optical packet and then the route is switched by an ultrahigh-speed optical packet switching apparatus (see Reference (1) in the following Related Art List, for instance).

The IP packet does not transfer any significant information in the absence of data therein, so that the bandwidth corresponding thereto is wasted. However, if the optical packet switching system is realized, then the time slot of a packet where data is absent can be occupied by another packet. Therefore, the optical packet switching system is considered a promising technology of the future which is capable of markedly enhancing the bandwidth usage efficiency of the transmission path.

RELATED ART LIST (1) Japanese Unexamined Patent Application Publication No. 2008-235986.

It is known by those skilled in the art that the erbium doped fiber amplifier (EDFA) is an optical device indispensable in the WDM system. In the optical packet transmission system, too, it is necessary to provide the EDFA on an input side or an output side of an optical packet switch to compensate for a loss when the transmission distance or the number of switching stages is increased.

FIGS. 1A and 1B are diagrams for comparison between optical signals in optical path transmission and optical packet signals in optical packet transmission. FIG. 1A shows the optical signals in optical path transmission, whereas FIG. 1B shows the optical packet signals in optical packet transmission. In an optical path transmission, the optical power is constant because a mark rate of 50% is always guaranteed for the optical signals transmitted. In contrast to this, with optical packet signals, the packet length varies with each packet such that there are time slots where there are optical signals and time slots where there are not. In this patent specification, the term "packet density" is used as an indicator of the ratio of presence of optical packets. The packet density is defined as "packet length/packet interval" (the ratio of packet length over packet interval). The packet density is 100% for optical signals in an optical path transmission.

As the packet density lowers, so does an average value of optical power. In this process, there occurs a phenomenon in which the gain of the EDFA changes in dependence on the packet density. The EDFA acquires gain as the power of the excitation light transfers to the signal light through stimulated emission. Thus, as an average optical power of the signal light rises, the gain drops due to the shortage of the power of the excitation light.

As a result of this phenomenon, when the packet density changes with time while the peak power of inputted optical packet signals remains constant, the optical gain of the EDFA changes and consequently the peak power of outputted optical packet signals changes. Such variations can simply be accumulated if the signals pass through multiple stages of similar EDFAs. For example, a variation of 1 dB per one stage of EDFA will grow to a large variation of 10 dB after a passage through ten stages of EDFAs. And such a large variation of the peak power can adversely affect the error rate characteristics of an optical receiver that receives optical packet signals.

Normally, in the optical path transmission, attempts are made to prevent such variations. That is, input and output powers of the EDFA are measured, and an automatic gain control (AGC) is applied to automatically control the excitation light power to achieve a constant gain. On the other hand, in the optical packet transmission, if the packet density changes within a range of 0.01% to 100%, for instance, this will present a dynamic range as wide as 10,000 times (40 dB). It is difficult to ensure accuracy of an optical monitor circuit for such a wide dynamic range, and it is not easy to apply the same technology as with the optical path transmission.

The carrier relaxation time of the EDFA is about several milliseconds (ms). The optical packet, which is of variable length, is approximately on the orders of ns and us or shorter in time. Therefore, it can be considered that the gain changes with the packet density as observed on the order of ms, not on a packet-by-packet basis.

Thus far, a description has been given of the gain variation characteristics of the EDFA. Nevertheless, similar variations in optical gain can occur with a semiconductor optical amplifier (SOA), which performs optical amplification on another operating principle. Similar to the semiconductor laser, the semiconductor optical amplifier operates on the principle that the signal light can be amplified using the stimulated emission which occurs when current is injected into an active layer of a semiconductor to cause a recombination of electrons and holes. While a semiconductor laser has a resonator formed by a reflector or the like, the semiconductor optical amplifier is of a structure such that only a single propagation from input port to output port is permitted by the use of nonreflective processing and an isolator.

The active layer of the semiconductor is characteristic in that if the drive current increases, its gain decreases due to the resulting heating. In actuality, such effect is reduced by the application of cooling by a Peltier cooler. Yet, even when the drive current remains constant, there may result a difference in gain between a case where the drive current is on continuously and a case where the drive current is off most of the time and turns on only sometimes.

In the optical path transmission, it is possible to measure the input and output powers of the semiconductor optical amplifier and perform an automatic gain control. However, in the optical packet transmission, it is not easy to perform an automatic gain control in the similar manner to the EDFA.

The ratio of on and off of drive current is equivalent to the packet density. The relationship between the packet density and the gain is similar to that of the EDFA. However, the response time of the semiconductor optical amplifier, which is determined by the temperature response time in an active region, is different from that of the EDFA. The response time can vary with the drive current, the drive capacity for Peltier cooling, and the design of a heat dissipation structure, etc., but the response time, which is of a temperature response, is generally assumed to be in a range of second to minute values. Yet, the response will become quicker with reduced heat capacity requirement that may come with the development of devices featuring greater power saving, lower heating and smaller size in the future.

SUMMARY OF THE INVENTION

The present invention has been made in view of the foregoing circumstances, and a general purpose is to provide a technology for stabilizing a peak power of optical packet signals in an optical packet switching apparatus having an optical amplifier.

In order to resolve the above-described problems, an optical packet switching apparatus according to one embodiment of the present invention comprises: an optical packet switch configured to switch a route of an inputted optical packet signal and output the inputted optical packet signal; a packet density monitoring unit configured to detect a packet density of an optical packet signal inputted to the optical packet switch and/or a packet density of an optical packet signal outputted from the optical packet switch; an optical amplifier provided on an input side and/or an output side of the optical packet switch; a variable optical attenuator provided anterior to or posterior to the optical amplifier; a storage configured to store gain characteristics in relation to the packet density at the optical amplifier; and a control unit configured to control an attenuation by the variable optical attenuator in such a manner as to compensate for gain fluctuation due to variation in the packet density at the optical amplifier, based on the packet density and the gain characteristics.

The optical amplifier and the variable optical attenuator may be provided for each input port and/or each output port of the optical packet switching apparatus, wherein the packet density monitoring unit may detect the packet density for each input port and/or each output port thereof, and wherein the control unit may control the attenuation by the variable optical attenuator for each input port and/or each output port thereof.

The packet density monitoring unit may calculate the packet density based on the count of inputs and/or outputs and the packet length of the optical packet signal.

The optical amplifier may be an erbium doped fiber amplifier (EDFA), and an excitation light power of the EDFA may be set to a constant value. Also, the optical amplifier may be a semiconductor optical amplifier, and a drive current of the semiconductor optical amplifier may be set to a constant value.

Another embodiment of the present invention relates also to an optical packet switching apparatus. The apparatus comprises: an optical packet switch configured to switch a route of an inputted optical packet signal and output the inputted optical packet signal; a packet density monitoring unit configured to detect a packet density of an optical packet signal inputted to the optical packet switch and/or a packet density of an optical packet signal outputted from the optical packet switch; an erbium doped fiber amplifier (EDFA) provided on an input side and/or an output side of the optical packet switch; a storage configured to store gain characteristics in relation to the packet density at the EDFA; and a control unit configured to control an excitation light power, based on the packet density and the gain characteristics, in such a manner that a gain of the EDFA is constant.

Still another embodiment of the present invention relates also to an optical packet switching apparatus. The apparatus comprises: an optical packet switch configured to switch a route of an inputted optical packet signal and output the inputted optical packet signal; a packet density monitoring unit configured to detect a packet density of an optical packet signal inputted to the optical packet switch and/or a packet density of an optical packet signal outputted from the optical packet switch; a semiconductor optical amplifier provided on an input side and/or an output side of the optical packet switch; a storage configured to store gain characteristics in relation to the packet density at the semiconductor optical amplifier; and a control unit configured to control a drive current, based on the packet density and the gain characteristics, in such a manner that a gain of the semiconductor optical amplifier is constant.

Still another embodiment of the present invention relates also to an optical packet switching apparatus. The apparatus comprises: an optical packet switch configured to switch a route of an inputted optical packet signal and output the inputted optical packet signal; a packet density monitoring unit configured to detect a packet density of an optical packet signal inputted to the optical packet switch and/or a packet density of an optical packet signal outputted from the optical packet switch; an erbium doped fiber amplifier (EDFA) provided on an input side and/or an output side of the optical packet switch; a variable optical attenuator provided anterior to or posterior to the EDFA; a storage configured to store gain characteristics in relation to the packet density at the EDFA and configured to store wavelength dependent gain relative to the packet density; and a control unit configured to control an excitation light power in such a manner as to compensate for wavelength dependent gain variation due to variation in the packet density at the EDFA, based on the packet density and the wavelength dependent gain, and configured to control an attenuation by the variable optical attenuator in such a manner as to compensate for gain fluctuation due to variation in the packet density at the EDFA, based on the packet density and the gain characteristics.

Still another embodiment of the present invention relates to an optical packet switching system. The optical packet switching system comprises: any one of the above-described optical packet switching apparatuses; and an optical packet in-line amplifier apparatus for relaying and amplifying an optical packet signal inputted from the optical packet switching apparatus. The optical packet switching apparatus further includes a transfer unit configured to transfer the packet density detected by the packet density monitoring unit, to the optical packet in-line amplifier apparatus. The optical packet in-line amplifier apparatus includes: a relaying optical amplifier configured to amplify the inputted optical packet signal; a relaying variable optical attenuator provided anterior to or posterior to the relaying optical amplifier; a relay storage configured to store gain characteristics in relation to the packet density at the relaying optical amplifier; and a relay control unit configured to control an attenuation by the relaying variable optical attenuator in such a manner as to compensate for gain fluctuation due to variation in the packet density at the relaying optical amplifier, based on the packet density and the gain characteristics fed from the optical packet switching apparatus.

The transfer unit may transfer information on the packet density using a monitor/control signal.

The optical packet switching system may include a plurality of the optical packet in-line amplifier apparatuses. Each of the optical packet switching apparatuses may further include a transfer unit configured to transfer the received information on the packet density to an optical packet switching apparatus provided posterior thereto.

Still another embodiment of the present invention relates also to an optical packet switching system. The optical packet switching system comprises: any one of the above-described optical packet switching apparatuses; and an optical packet in-line amplifier apparatus for relaying and amplifying an optical packet signal inputted from the optical packet switching apparatus. The optical packet switching apparatus further includes a transfer unit configured to transfer information on the packet density detected by the packet density monitoring unit, to the optical packet in-line amplifier apparatus. The optical packet in-line amplifier apparatus includes: a relaying EDFA (erbium doped fiber amplifier) configured to amplify the inputted optical packet signal; a relay storage configured to store gain characteristics in relation to the packet density at the relaying EDFA; and a relay control unit configured to control an excitation light power, based on the packet density and the gain characteristics fed from the optical packet switching apparatus, in such a manner that a gain of the relaying EDFA is constant.

Still another embodiment of the present invention relates also to an optical packet switching system. The optical packet switching system comprises: an optical packet switching apparatus; and an optical packet in-line amplifier apparatus for relaying and amplifying an optical packet signal inputted from the optical packet switching apparatus. The optical packet switching apparatus further includes a transfer unit configured to transfer information on the packet density detected by the packet density monitoring unit, to the optical packet in-line amplifier apparatus. The optical packet in-line amplifier apparatus includes: a relaying semiconductor optical amplifier configured to amplify the inputted optical packet signal; a relay storage configured to store gain characteristics in relation to the packet density at the relaying semiconductor optical amplifier; and a relay control unit configured to control a drive current, based on the packet density and the gain characteristics fed from the optical packet switching apparatus, in such a manner that a gain of the relaying semiconductor optical amplifier is constant.

Still another embodiment of the present invention relates also to an optical packet switching system. The optical packet switching system comprises: any one of the above-described optical packet switching apparatus; and an optical packet in-line amplifier apparatus for relaying and amplifying an optical packet signal inputted from the optical packet switching apparatus. The optical packet switching apparatus further includes a transfer unit configured to transfer information on the packet density detected by the packet density monitoring unit, to the optical packet in-line amplifier apparatus. The optical packet in-line amplifier apparatus includes: a relaying EDFA (erbium doped fiber amplifier) configured to amplify the inputted optical packet signal; a relaying variable optical attenuator provided anterior to or posterior to the relaying EDFA; a relay storage configured to store gain characteristics in relation to the packet density at the relaying EDFA and configured to store wavelength dependent gain relative to the packet density; and a control unit configured to control an excitation light power in such a manner as to compensate for wavelength dependent gain variation due to variation in the packet density at the EDFA, based on the packet density and the wavelength dependent gain, and configured to control an attenuation by the relaying variable optical attenuator in such a manner as to compensate for gain fluctuation due to variation in the packet density at the relaying EDFA, based on the packet density and the gain characteristics.

Still another embodiment of the present invention relates to an optical packet in-line amplifier apparatus for relaying and amplifying an optical packet signal inputted from an optical packet switching apparatus. The optical packet in-line amplifier apparatus comprises: a relaying optical amplifier configured to amplify the inputted optical packet signal; a relaying variable optical attenuator provided anterior to or posterior to the relaying optical amplifier; a relay storage configured to store gain characteristics in relation to a packet density at the relaying optical amplifier; a receiver configured to receive information on the packet density from the optical packet switching apparatus; and a relay control unit configured to control an attenuation by the relaying variable optical attenuator in such a manner as to compensate for gain fluctuation due to variation in the packet density at the relaying optical amplifier, based on the packet density and the gain characteristics.

The optical packet in-line amplifier apparatus may further comprise a transfer unit configured to transfer the received information on the packet density to an optical packet in-line amplifier apparatus provided posterior thereto.

Still another embodiment of the present invention relates also to an optical packet in-line amplifier apparatus for relaying and amplifying an optical packet signal inputted from an optical packet switching apparatus. The optical packet in-line amplifier apparatus comprises: a relaying EDFA (erbium doped fiber amplifier) configured to amplify the inputted optical packet signal; a relay storage configured to store gain characteristics in relation to a packet density at the relaying EDFA; a receiver configured to receive information on the packet density from the optical packet switching apparatus; and a relay control unit configured to control an excitation light power, based on the packet density and the gain characteristics, in such a manner that a gain of the relaying EDFA is constant.

Still another embodiment of the present invention relates also to an optical packet in-line amplifier apparatus for relaying and amplifying an optical packet signal inputted from an optical packet switching apparatus. The optical packet in-line amplifier apparatus comprises: a relaying semiconductor optical amplifier configured to amplify the inputted optical packet signal; a relay storage configured to store gain characteristics in relation to a packet density at the relaying semiconductor optical amplifier; a receiver configured to receive information on the packet density from the optical packet switching apparatus; and a relay control unit configured to control a drive current, based on the packet density and the gain characteristics, in such a manner that a gain of the relaying semiconductor optical amplifier is constant.

Still another embodiment of the present invention relates also to an optical packet in-line amplifier apparatus for relaying and amplifying an optical packet signal inputted from an optical packet switching apparatus. The optical packet in-line amplifier apparatus comprises: a relaying EDFA (erbium doped fiber amplifier) configured to amplify the inputted optical packet signal; a relaying variable optical attenuator provided anterior to or posterior to the relaying EDFA; a relay storage configured to store gain characteristics in relation to a packet density at the relaying EDFA; a receiver configured to receive information on the packet density from the optical packet switching apparatus; and a relay control unit configured to control an excitation light power in such a manner as to compensate for wavelength dependent gain variation due to variation in the packet density at the relaying EDFA, based on the packet density and the wavelength dependent gain, and configured to control an attenuation by the relaying variable optical attenuator in such a manner as to compensate for gain fluctuation due to variation in the packet density at the relaying EDFA, based on the packet density and the gain characteristics.

Optional combinations of the aforementioned constituting elements, and implementations of the invention in the form of methods, apparatuses, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Optical packet switching apparatuses according to the preferred embodiments will be described with reference to Drawings. The present invention will first be outlined before a detailed description is given of the preferred embodiments thereof.

First Embodiment

Figure 1A:
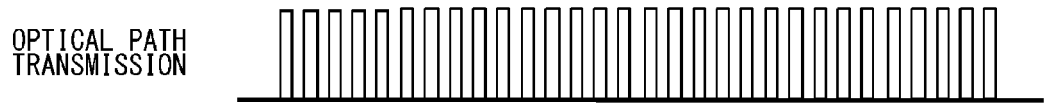
FIGS. 1A and 1B are diagrams for comparison between optical signals in optical path transmission and optical packet signals in optical packet transmission.
Figure 1B:
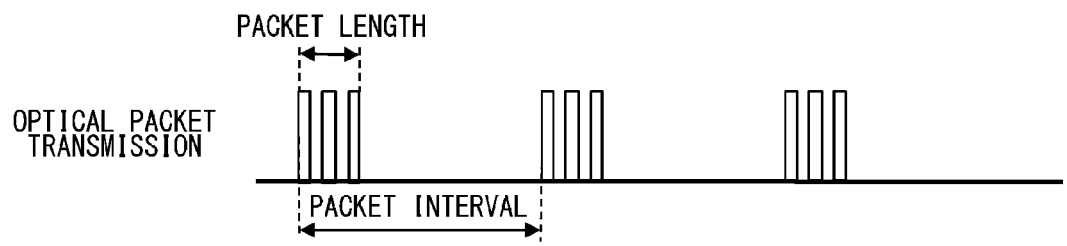
Figure 2:
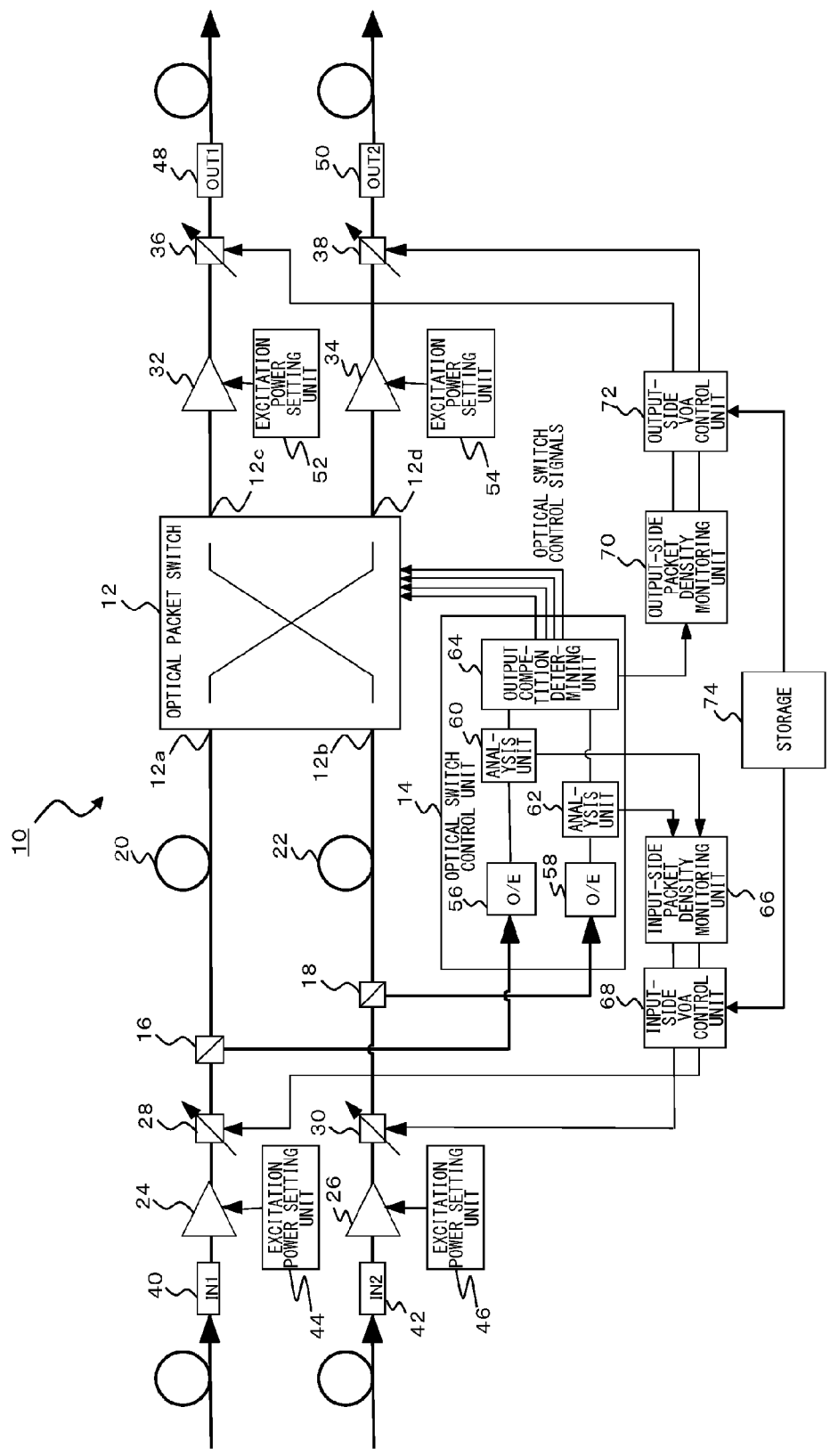
FIG. 2 shows an optical packet switching apparatus according to a first embodiment of the present invention.

FIG. 2 shows an optical packet switching apparatus 10 according to a first embodiment of the present invention. As shown in FIG. 2, the optical packet switching apparatus 10 includes an optical packet switch 12, an optical switch control unit 14, a first optical coupler 16, a second optical coupler 18, a first optical delay line 20, a second optical delay line 22, a first input-side optical amplifier 24, a second input-side optical amplifier 26, a first input-side variable optical attenuator (VOA) 28, a second input-side variable optical attenuator 30, a first output-side optical amplifier 32, a second output-side optical amplifier 34, a first output-side variable optical attenuator 36, a second output-side variable optical attenuator 38, an input-side packet density monitoring unit 66, an output-side packet density monitoring unit 70, an input-side VOA control unit 68, an output-side VOA control unit 72, and a storage 74.

The optical packet switching apparatus 10 according to the first embodiment is an optical packet switching apparatus with two inputs and two outputs. An optical packet signal entering a first input unit 40 via an optical transmission path is amplified by the first input-side optical amplifier 24. Then the optical packet signal passes through the first input-side variable optical attenuator 28, which is disposed posterior to the first input-side optical amplifier 24, and is inputted to the first optical coupler 16. The first optical coupler 16 bifurcates the optical packet signal into two optical packet signals. One of the bifurcated optical packet signals is inputted to a first input port 12a of the optical packet switch 12 via the first optical delay line 20. The other of the bifurcated optical packet signals is inputted to the optical switch control unit 14.

Also, an optical packet signal entering a second input unit 42 via another optical transmission path is amplified by the second input-side optical amplifier 26. Then the optical packet signal passes through the second input-side variable optical attenuator 30, which is disposed posterior to the second input-side optical amplifier 26, and is inputted to the second optical coupler 18. The second optical coupler 18 bifurcates the optical packet signal into two optical packet signals. One of the bifurcated optical packet signals is inputted to a second input port 12b of the optical packet switch 12 via the second optical delay line 22. The other of the bifurcated optical packet signals is inputted to the optical switch control unit 14.

The optical switch control unit 14 extracts routing information from the inputted optical packet signal and outputs control signals to the optical packet switch 12 according to the routing information. As shown in FIG. 2, the optical switch control unit 14 includes a first optical-to-electrical (O/E) converter 56, a second optical-to-electrical (O/E) converter 58, a first analysis unit 60, a second analysis unit 62, and an output competition determining unit 64.

The first O/E converter 56 converts an optical packet signal received from the first optical coupler 16 into an electrical signal. Also, the second O/E converter 58 converts an optical packet signal received from the second optical coupler 18 into an electrical signal.

The first analysis unit 60 detects the routing information by analyzing the header of the packet signal received from the first O/E converter 56. Also, the second analysis unit 62 detects the routing information by analyzing the header of the packet signal received from the second O/E conversion unit 58.

The output competition determining unit 64 determines whether to pass or discard the optical packet, based on the results of analysis by the first analysis unit 60 and the second analysis unit 62, and outputs optical switch control signals to the optical packet switch 12 based on the determination. For example, let us consider a case where optical packets are inputted to the first input port 12a and the second input port 12b, respectively, and those two optical packets are outputted to the first output port 12c. In this case, the output competition determining unit 64 determines whether the two optical packets are in competition with each other or not. In other words, the output competition determining unit 64 determines whether the two optical packets are overlapped with each other in time. If the two optical packets are competing with each other, then the output competition determining unit 64 will pass the optical packet having arrived earlier and discard the one having arrived later.

The optical packet switch 12 is a "2×2" optical switch. In the first embodiment, an optical gate switch employing a semiconductor optical amplifier is used as the optical packet switch 12. Alternatively, the optical packet switch 12 may be one using PLZT (a thin film of lead zirconate titanate (PZT) doped with lanthanum) or the like. The optical packet switch 12, whose on/off is controlled by the optical switch control signals from the optical switch control unit 14, switches the route of the inputted optical packet signal and outputs it.

The first optical delay line 20 and the second optical delay line 22 each delay one of the bifurcated optical packet signals by the time the optical switch control unit 14 takes to generate the optical switch control signals. Thus, the first optical delay line 20 and the second optical delay line 22 allow the on/off control of the optical packet switch 12 in time with the arrival of the optical packet signal at the optical packet switch 12.

An optical packet signal outputted from the first output port 12c of the optical packet switch 12 is amplified by the first output-side optical amplifier 32. Then the optical packet signal passes through the first output-side variable optical attenuator 36, which is disposed posterior to the first output-side optical amplifier 32, and is outputted to an optical transmission path from the first output unit 48. Also, an optical packet signal outputted from the second output port 12d of the optical packet switch 12 is amplified by the second output-side optical amplifier 34. Then the optical packet signal passes through the second output-side variable optical attenuator 38, which is disposed posterior to the second output-side optical amplifier 34, and is outputted to another optical transmission path from the second output unit 50.

In the first embodiment, the EDFA is used as the first input-side optical amplifier 24, the second input-side optical amplifier 26, the first output-side optical amplifier 32 and the second output-side optical amplifier 34. The power of the excitation light of the EDFAs is set constant respectively by a first input-side excitation power setting unit 44, a second input-side excitation power setting unit 46, a first output-side excitation power setting unit 52 and a second output-side excitation power setting unit 54 provided for their respective EDFAs. Thus, in the first embodiment, the optical amplifiers are controlled not by the automatic gain control (AGC) or the automatic level control (ALC) but by a method of controlling the power of the excitation light to a fixed predetermined value. The latter methodology is employed because the optical packet signal is subject to variation in packet density, which makes it difficult to monitor the optical power accurately.

Also, in the first embodiment, the variable optical attenuator of magneto-optic type is used as the first input-side variable optical attenuator 28, the second input-side variable optical attenuator 30, the first output-side variable optical attenuator 36 and the second output-side variable optical attenuator 38. For those variable optical attenuators, ones having the response speed in the ms range may be used irrespective of the operating principle. For example, the variable optical attenuators of the thermo-optic type or the MEMS (micro-electro-mechanical system) type, in addition to the magneto-optic type, may be employed.

The input-side packet density monitoring unit 66 detects the packet density of the optical packet signal inputted to the first input port 12a of the optical packet switch 12. The input-side packet density monitoring unit 66 also detects the packet density of the optical packet signal inputted to the second input port 12b of the optical packet switch 12. Inputted to the input-side packet density monitoring unit 66 is information on the number of inputs and packet length of the optical packets, which are obtained by header analysis of the optical packet signal, from the first analysis unit 60 and the second analysis unit 62. The input-side packet density monitoring unit 66 calculates the packet density based on the number of inputs and packet length of the optical packets. In this manner, the packet density is detected independently for each input port of the optical packet switch 12.

The output-side packet density monitoring unit 70 detects the packet density of the optical packet signal outputted from the first output port 12c of the optical packet switch 12. The output-side packet density monitoring unit 70 also detects the packet density of the optical packet signal outputted from the second output port 12d of the optical packet switch 12. Inputted to the output-side packet density monitoring unit 70 is information on the number of outputs and packet length of the optical packets which are determined passable by the output competition determining unit 64. The output-side packet density monitoring unit 70 calculates the packet density based on the number of outputs and packet length of the optical packets. In this manner, the packet density is detected independently for each output port of the optical packet switch 12.

A cumulative packet byte counter is prepared for each of the input ports and output ports in order to count the number of inputs or outputs of the packets. As for the input packets, the number of bytes of a packet is added to the cumulative packet byte counter of the input port whenever a new packet is received. As for the output packets, the number of bytes of a packet is added to the cumulative packet byte counter of the output port whenever a new packet is transferred to the output port after passing through the optical packet switch 12. In this process, no counting is done of the packets that are discarded. And while the counter value is retained for a time substantially equivalent to the response time of the optical amplifier in need of gain compensation (about 5 ms for the EDFA), the cumulative counter is reset and the counting is resumed for the next time frame.

The following are equations for calculating the packet density:

Packet density=Counter value[bytes]/(Retention time [s]×Bit rate[bits/s]/8)

For example, if the counter value is 150,000 [bytes], the retention time 5 ms, and the bit rate 10 Gbps, the packet density will be $150,000/(5 \times 10^{-3} \times 10 \times 10^9/8) = 0.024 = 2.4\%$.

The storage 74 stores gain characteristics relative to the packet density which belong to the first input-side optical amplifier 24, the second input-side optical amplifier 26, the first output-side optical amplifier 32, and the second output-side optical amplifier 34.

Figure 3:
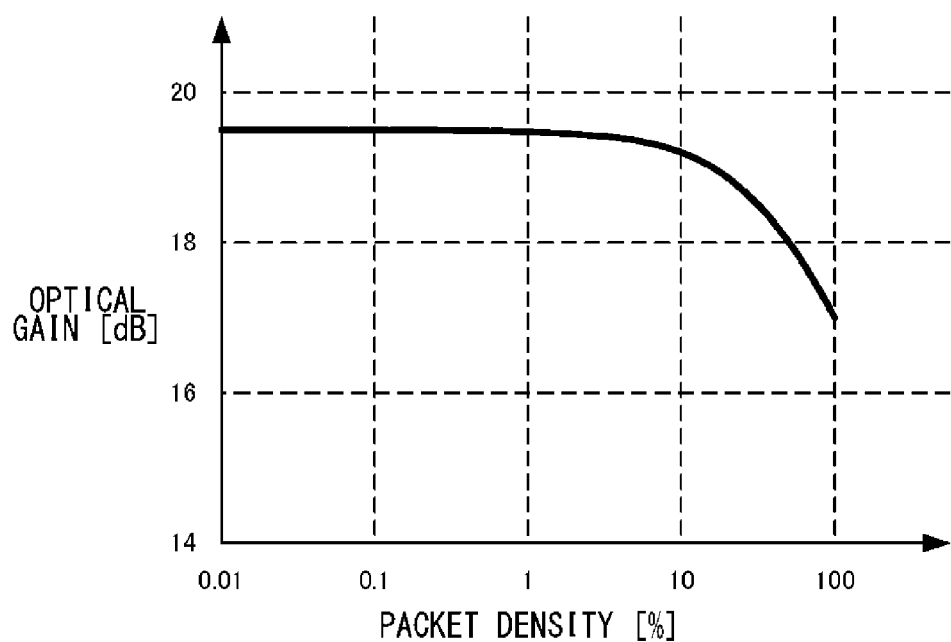
FIG. 3 shows an example of gain characteristics in relation to the packet density.

FIG. 3 shows an example of gain characteristics in relation to the packet density. In FIG. 3, the horizontal axis represents the packet density of optical packet signals inputted to the EDFA, and the vertical axis is the optical gain of the EDFA. In the gain characteristics of FIG. 3, the power of the excitation light is constant. As is evident in FIG. 3, the optical gain of EDFA becomes saturated at a certain level when the packet density is low, but decreases gradually when the packet density is high.

The gain characteristics of the optical amplifiers to be stored in the storage 74 are measured in advance, for instance, at the startup of the equipment. Where variation of gain characteristics between the optical amplifiers is small, it is allowable that the gain characteristics are measured for a single optical amplifier. Or where variation of gain characteristics between the optical amplifiers is large, it is desirable that the gain characteristics are measured for all the optical amplifiers.

The input-side VOA control unit 68 controls the attenuations of the first input-side variable optical attenuator 28 and the second input-side variable optical attenuator 30 in such a manner as to compensate for the gain variation due to the packet density variation at the first input-side optical amplifier 24 and the second input-side optical amplifier 26, based on the information on the packet density detected by the input-side packet density monitoring unit 66 and the gain characteristics relative to the packet density stored in the storage 74. As a result, the gain variation due to the packet density variation at the first input-side optical amplifier 24 and the second input-side optical amplifier 26 is compensated for, and thus it is possible to stabilize the peak power of the optical packet signals without regard to the packet density.

Let us assume that the density of packets of an optical packet signal inputted to the first input unit 40 is A% and the gain of the first input-side optical amplifier 24 at this time is X dB. Then if the packet density rises to B% and the gain lowers to Y dB, the gain of the first input-side optical amplifier 24 will be lower by "X−Y" dB. The input-side VOA control unit 68 derives this gain loss from the packet density information and the gain characteristics and lowers the attenuation of the first input-side variable optical attenuator 28 in such a manner as to cancel out the gain loss. Thus it is possible to make the peak power of the optical packet signals constant irrespective of the packet density.

The output-side VOA control unit 72 controls the attenuations of the first output-side variable optical attenuator 36 and the second output-side variable optical attenuator 38 in such a manner as to compensate for the gain variation due to the packet density variation at the first output-side optical amplifier 32 and the second output-side optical amplifier 34, based on the information on the packet density detected by the output-side packet density monitoring unit 70 and the gain characteristics relative to the packet density stored in the storage 74. As a result, the gain variation due to the packet density variation at the first output-side optical amplifier 32 and the second output-side optical amplifier 34 is compensated for, and thus it is possible to stabilize the peak power of the optical packet signals without regard to the packet density.

Normally, the attenuations of the variable optical attenuators are controlled using the input and output optical powers of the variable optical attenuators detected by a monitor. However, as described above, it is difficult to detect the optical powers for the optical packet signals. Thus, an initial value of the attenuation of each variable optical attenuator is determined as follows. That is, the characteristics of the attenuation relative to a control voltage or control current for the variable optical attenuator is measured in advance and then the control voltage or control current at which the attenuation to be set is assumed to be attainted is set.

In the above-described first embodiment, EDFA is used as each optical amplifier. However, this should not be considered as limiting and, for example, SOA may be used instead. In such a case, the drive current supplied to SOA is set constant. Also, the storage 74 stores gain characteristics relative to the packet density of SOA.

Where EDFA is used as the optical amplifier, the control cycle of each variable optical attenuator may be set to about several milliseconds since the carrier relaxation time of the EDFA is about several ms. This speed is realizable by the currently available variable optical attenuator. Also, the response of SOA is slower in terms of temperature characteristics than the EDFA, so that the speed can be realized by the currently available variable optical attenuator using SOA.

In the optical packet switching apparatus 10, as the packets are switched, an optical packet enters at the first input port 12a and comes out of the second output port 12d, for example, and an optical packet enters at the second input port 12b and comes out of the first output port 12c, for example. Also, optical packets converge on a single output port and then discarded. Thus, the packet density of optical packet signals passing each port varies independently. Hence, as in the first embodiment, the structure is preferred such that the packet density is detected for each input/output port and the VOA corresponding thereto is controlled.

In the above-described first embodiment, each variable optical attenuator is provided subsequent to each optical amplifier. This structure, which allows the input power to the optical amplifier to be kept as high as practicable, is advantageous in terms of signal-to-noise (S/N) ratio. Nevertheless, the variable optical attenuator may also be provided anterior to the optical amplifier. In such case, too, the attenuations of the variable optical attenuators are controlled in such a manner as to compensate for the gain variation due to the packet density variation at the optical amplifiers provided posterior thereto, based on the information on the packet density and the gain characteristics. As a result, the peak power of the optical packet signals outputted from the optical amplifiers can be stabilized regardless of the packet density and therefore a highly qualified optical packet switching function can be provided.

Second Embodiment

Figure 4:
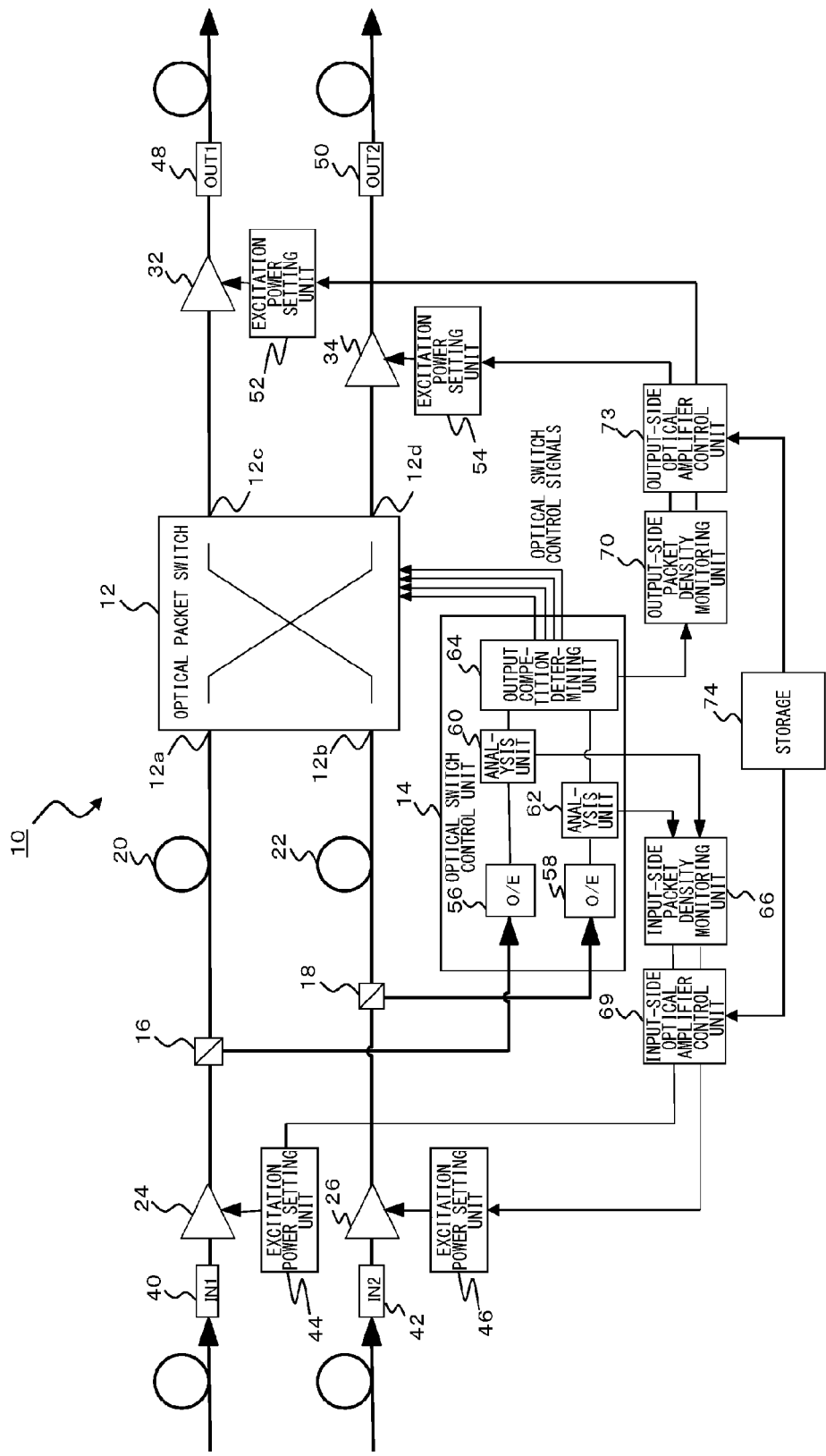
FIG. 4 shows an optical packet switching apparatus according to a second embodiment of the present invention.

FIG. 4 shows an optical packet switching apparatus according to a second embodiment of the present invention. Components of the optical packet switching apparatus 10 according to the second embodiment which are identical to or correspond to those of the optical packet switching apparatus 10 according to the first embodiment are given the same reference numerals herein and the detailed description thereof are omitted as appropriate.

In the optical packet switching apparatus 10 according to the second embodiment, the first input-side optical amplifier 24, the second input-side optical amplifier 26, the first output-side optical amplifier 32 and the second output-side optical amplifier 34 are each an erbium doped fiber amplifier (EDFA). Also, the storage 74 stores the gain characteristics relative to the packet density belonging to each EDFA.

The optical packet switching apparatus 10 according to the second embodiment includes an input-side optical amplifier control unit 69 and an output-side optical amplifier control unit 73 in place of the input-side VOA control unit 68 and the output-side VOA control unit 72 in the first embodiment.

The input-side optical amplifier control unit 69 controls the power of the excitation light, based on the information on the packet density detected by the input-side packet density monitoring unit 66 and the gain characteristics stored in the storage 74, in such a manner that the gains of the first input-side optical amplifier 24 and the second input-side optical amplifier 26 are constant. Also, the output-side optical amplifier control unit 73 controls the power of excitation light, based on the information on the packet density detected by the output-side packet density monitoring unit 70 and the gain characteristics stored in the storage 74, in such a manner that the gains of the first output-side optical amplifier 32 and the second output-side optical amplifier 34 are constant. That is, when the packet density becomes high and the gain is insufficient, the excitation power is increased, whereas when the packet density becomes low and the gain is excessive, the excitation power is reduced. In this manner, control is performed so that the gain can be constant. As a result, the peak power of the optical packet signals outputted from each EDFA can be stabilized without regard to the packet density.

In the optical packet switching apparatus 10 according to the second embodiment, the variable optical attenuators are no longer required as compared with the first embodiment. Thus the optical packet switching apparatus 10 according to the second embodiment has the advantage of reduced cost. At the same time, EDFA is characterized by the feature that the wavelength dependent gain vary when the excitation light power varies. As a result, it may be difficult to obtain a uniform gain over all wavelength bands. Thus, causation must be exercised as to this particular point when designing the apparatus.

In the above-described second embodiment, EDFA is used as each optical amplifier. However, this should not be considered as limiting and, for example, SOA may be used instead. In such a case, the input-side optical amplifier control unit 69 controls the drive current, based on the packet density information and the gain characteristics, in such a manner that the gains of the first input-side optical amplifier 24 and the second input-side optical amplifier 26 are constant. Also, the output-side optical amplifier control unit 73 controls the drive current, based on the packet density information and the gain characteristics, in such a manner that the gains of the first output-side optical amplifier 32 and the second output-side optical amplifier 34 are constant. That is, when the packet density becomes high and the gain is insufficient, the drive current is increased, whereas when the packet density becomes low and the gain is excessive, the drive current is reduced. In this manner, control is performed so that the gain can be constant. As a result, the peak power of the optical packet signals outputted from each SOA can be stabilized without regard to the packet density.

Third Embodiment

Figure 5:
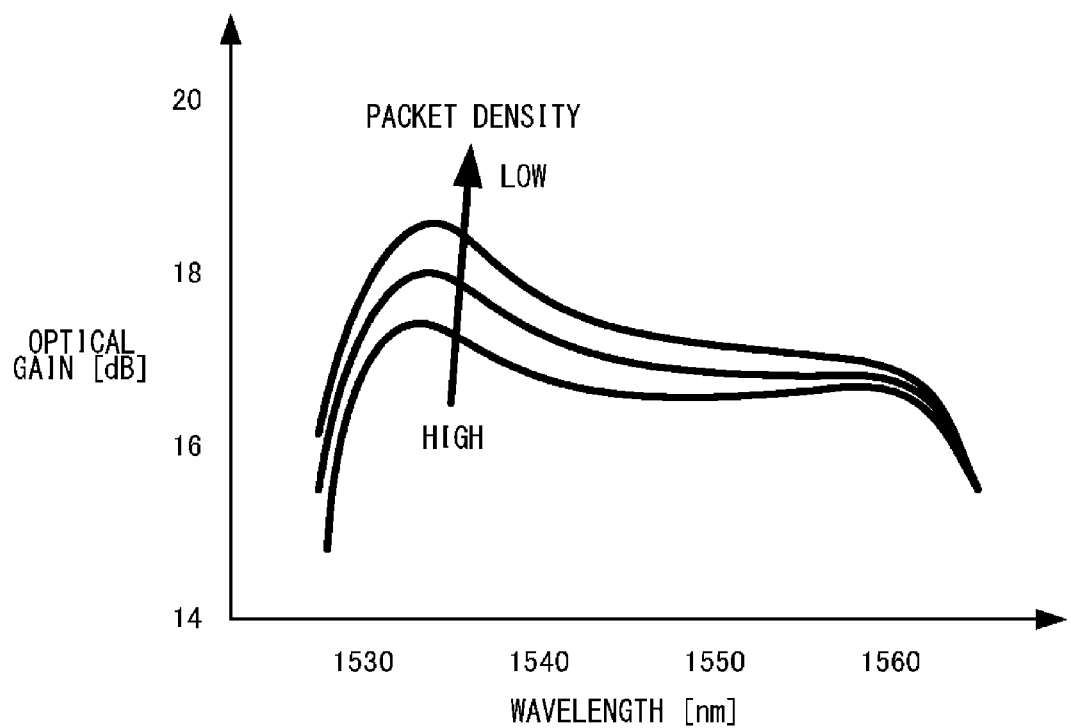
FIG. 5 shows an exemplary relationship between wavelength dependent gain of EDFA and the packet density.

As described above, EDFA has the property that the wavelength dependent gain vary when the power of the excitation light is changed. There may be cases where the wavelength dependent gain vary relative to the packet density even though the power of excitation power remains the same. FIG. 5 shows an exemplary relationship between the wavelength dependent gain of EDFA and the packet density. In FIG. 5, the horizontal axis represents the wavelength of packet signal inputted to EDFA, and the vertical axis is the optical gain of EDFA. FIG. 5 shows three different wavelength dependent gain when the packet density is varied. Note that the power of the excitation light is constant in the three wavelength dependent gain shown in FIG. 5.

As is evident in FIG. 5, the EDFA has the property that when the power of the excitation light is constant and the packet density is low, the gain on a short wavelength side increases. Conversely, when the power of the excitation light is constant and the packet density becomes high, the gain on a short wavelength side drops. Thus, it is possible that there are cases where the wavelength dependent gain described here cannot be compensated even though the gain calculated through the total power of the WDM signals can be made constant by implementing the structure of the first embodiment as shown in FIG. 2. Thus, in the third embodiment, a description is given of an optical packet switching apparatus capable of compensating for the wavelength dependent gain occurring in dependence of the packet density.

Figure 6:
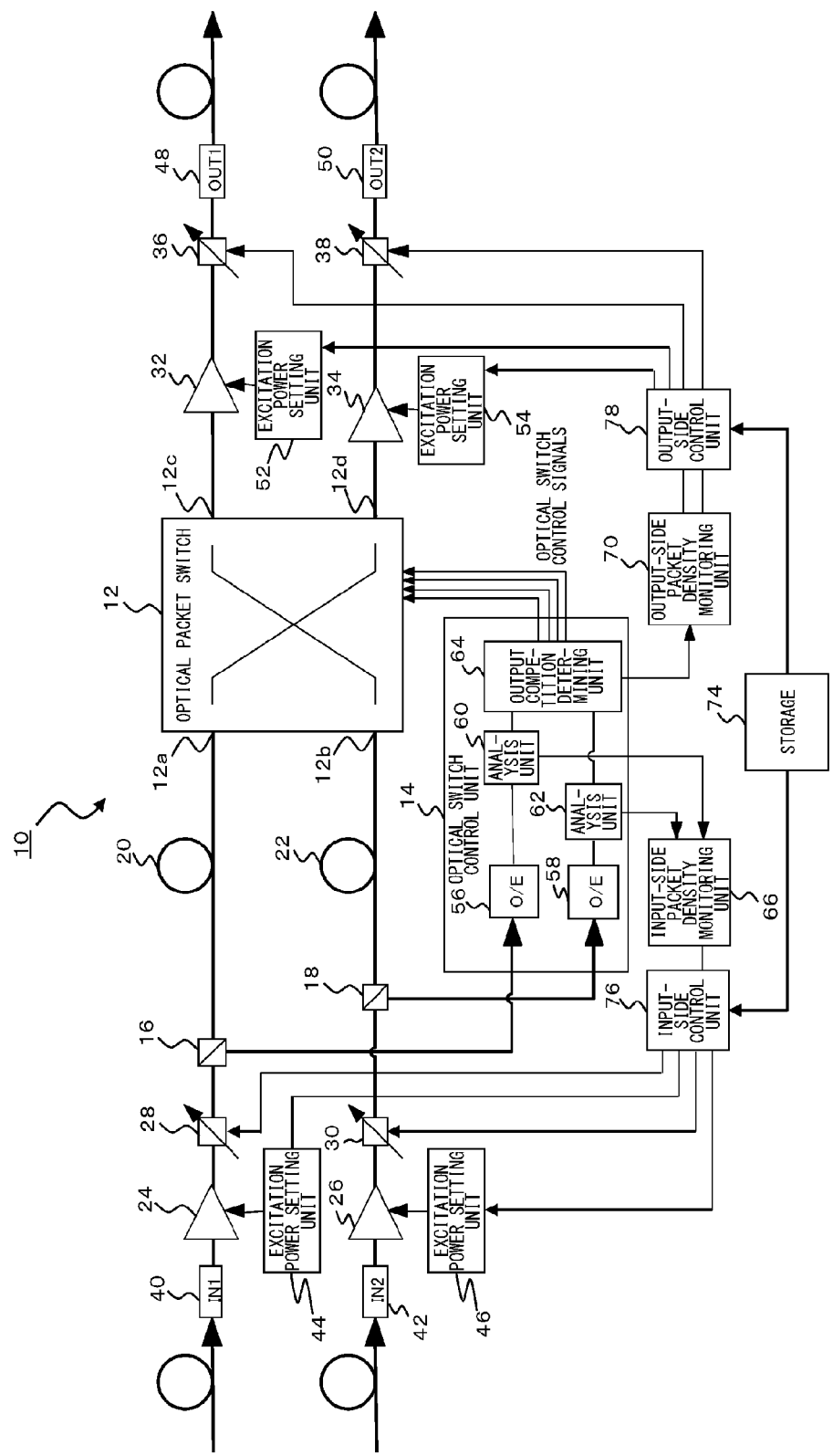
FIG. 6 shows an optical packet switching apparatus according to a third embodiment of the present invention.

FIG. 6 shows an optical packet switching apparatus according to a third embodiment of the present invention. Components of the optical packet switching apparatus 10 according to the third embodiment which are identical to or correspond to those of the optical packet switching apparatus 10 according to the first embodiment are also given the same reference numerals herein and the detailed description thereof are omitted as appropriate.

In the optical packet switching apparatus 10 according to the third embodiment, the first input-side optical amplifier 24, the second input-side optical amplifier 26, the first output-side optical amplifier 32 and the second output-side optical amplifier 34 are each an erbium doped fiber amplifier (EDFA). Also, the storage 74 stores the gain characteristics relative to the packet density belonging to each EDFA. Further, the storage 74 stores the wavelength dependent gain relative to the packet density belonging to each EDFA as shown in FIG. 5.

The optical packet switching apparatus 10 according to the third embodiment includes an input-side control unit 76 and an output-side control unit 78 in place of the input-side VOA control unit 68 and the output-side VOA control unit 72 in the first embodiment.

The input-side control unit 76 controls the power of the excitation light in such a manner as to compensate for a wavelength dependent gain variation due to the packet density variation at the first input-side optical amplifier 24 and the second input-side optical amplifier 26, based on the information on the packet density detected by the input-side packet density monitoring unit 66 and the wavelength dependent gain relative to the packet density stored in the storage 74. The input-side control unit 76 controls the power of the excitation light in such a manner as to uniformize the wavelength characteristics.

In the above-described control of the power of the excitation light, control is performed in such a manner as to uniformize the wavelength characteristics only. Thus, it is possible that variation may occur depending on the packet density variation, as the gain of the total power of the WDM signals. Thus, the input-side control unit 76 further controls the attenuations of the first input-side variable optical attenuator 28 and the second input-side variable optical attenuator 30 in such a manner as to compensate for the gain variation due to the packet density variation at the first input-side optical amplifier 24 and the second input-side optical amplifier 26, based on the information on the packet density fed from the input-side packet density monitoring unit 66 and the gain characteristics relative to the packet density stored in the storage 74. As a result, both the wavelength dependent gain in the EDFA and the gain characteristics in the EDFA can be made constant even though the packet density varies.

The output-side control unit 78 controls the power of the excitation light in such a manner as to compensate for a wavelength dependent gain variation due to the packet density variation at the first output-side optical amplifier 32 and the second output-side optical amplifier 34, based on the information on the packet density detected by the output-side packet density monitoring unit 70 and the wavelength dependent gain relative to the packet density stored in the storage 74. Further, the output-side control unit 78 controls the attenuations of the first output-side variable optical attenuator 36 and the second output-side variable optical attenuator 38 in such a manner as to compensate for the gain variation due to the packet density variation at the first output-side optical amplifier 32 and the second output-side optical amplifier 34, based on the information on the packet density fed from the output-side packet density monitoring unit 70 and the gain characteristics relative to the packet density stored in the storage 74. As a result, both the wavelength dependent gain and the gain characteristics in the EDFA can be made constant even though the packet density varies, and therefore a highly qualified optical packet switching function can be provided.

In the above-described third embodiment, each variable optical attenuator is provided subsequent to each optical amplifier. This structure, which allows the input power to the optical amplifier to be kept as high as practicable, is advantageous in terms of signal-to-noise (S/N) ratio. Nevertheless, the variable optical attenuator may also be provided anterior to the optical amplifier.

Fourth Embodiment

Figure 7:
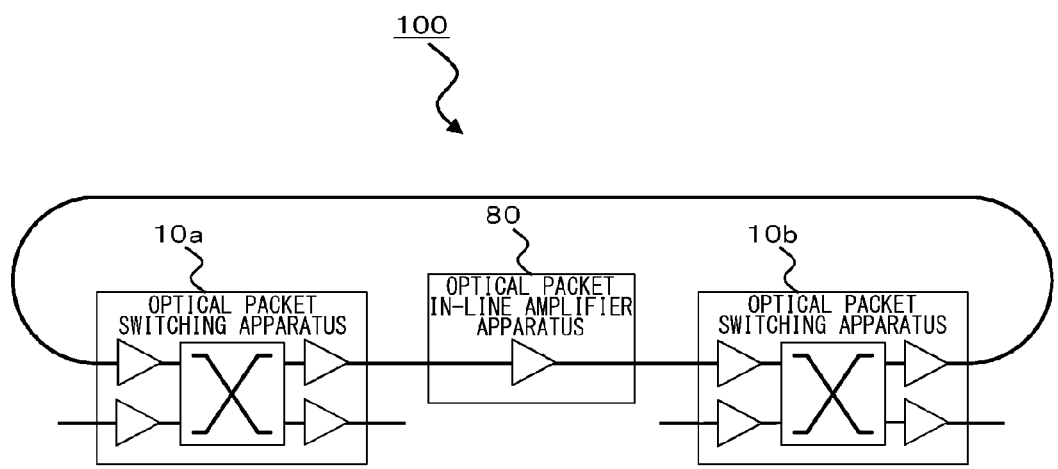
FIG. 7 shows an optical packet switching system according to a fourth embodiment of the present invention.

FIG. 7 shows an optical packet switching system 100 according to a fourth embodiment of the present invention. As shown in FIG. 7, the optical packet switching system 100 includes a first optical packet switching apparatus 10a, a second optical packet switching apparatus 10b, and an optical packet in-line amplifier apparatus 80 provided between the first optical packet switching apparatus 10a and the second optical packet switching apparatus 10b. The first optical packet switching apparatus 10a and the second optical packet switching apparatus 10b each has a structure similar to that of the optical packet switching apparatus 10 shown in FIG. 2. When neighboring switching stations are far away from each other and the optical loss needs to be compensated, there will be a need to provide the optical packet in-line amplifier apparatus 80 having an optical amplifier as in the fourth embodiment.

Since the optical packet signal is only amplified in the optical packet in-line amplifier apparatus 80, there is no header analysis unit for analyzing the header. However, since the optical packet in-line amplifier apparatus 80 has the optical amplifier, a problem is caused where the optical packet in-line amplifier apparatus 80 also suffers from the gain variation of the optical amplifier due to the packet density variation.

Figure 8:
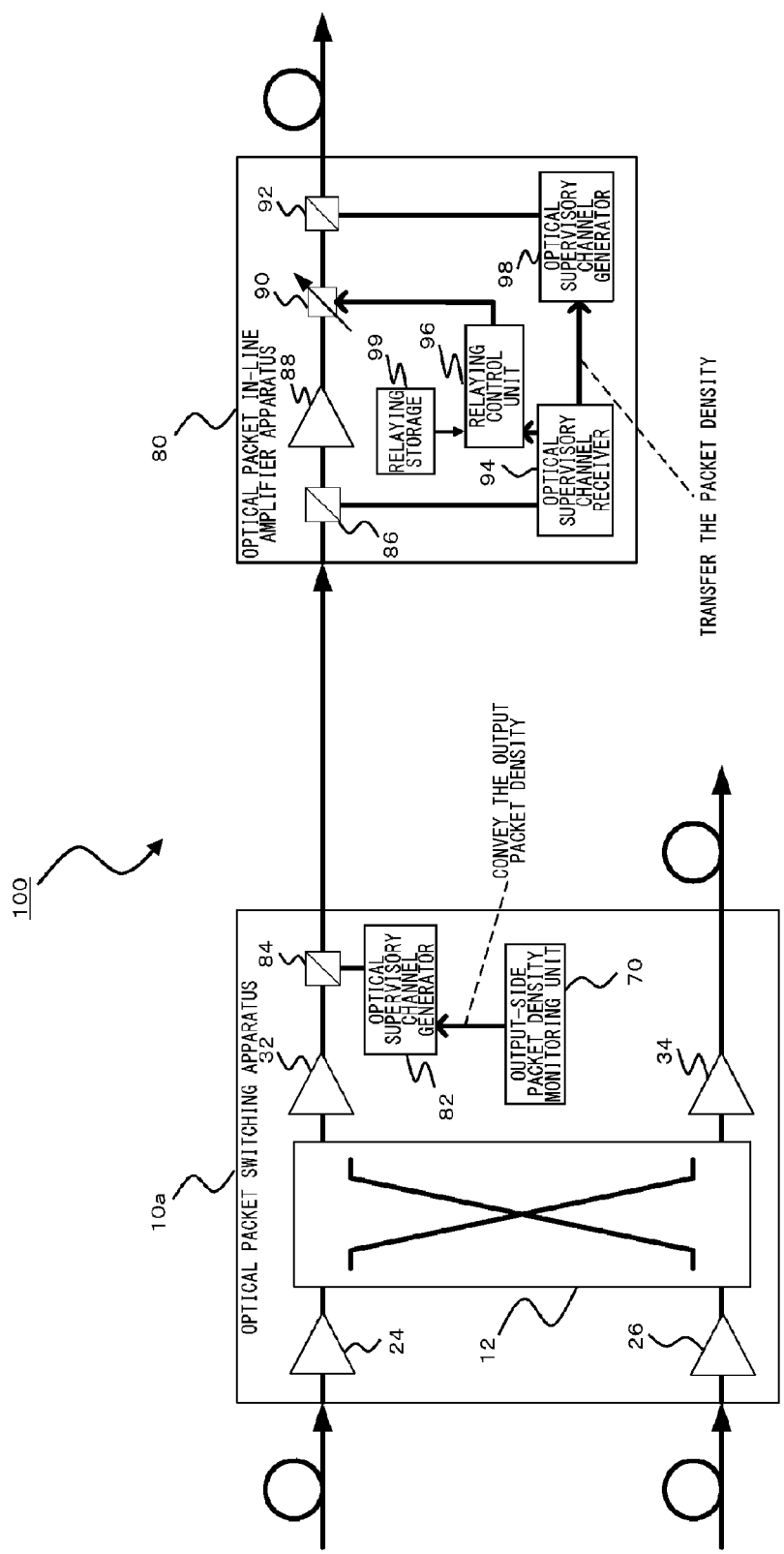
FIG. 8 shows a structure of an optical packet switching system.

FIG. 8 shows a structure of the optical packet switching system 100. The second optical packet switching apparatus 10b is omitted in FIG. 8.

In the optical packet switching system 100, the first optical packet switching apparatus 10a includes an optical supervisory channel (OSC) generator 82 and an optical coupler 84 in addition to the components of the optical packet switching apparatus 10 according to the first to third embodiments.

The optical supervisory channel (OSC) generator 82 generates an optical supervisory channel (OSC) through which various items of information on the optical packet switching system 100 are communicated between each node. The OSC is a signal having a wavelength different from the wavelength used for the optical packet signals. In the fourth embodiment, the OSC generator 82 assigns the packet density information on the first output port of the optical packet switch 12, conveyed from the output-side packet density monitoring unit 70, to a predetermined field of the OSC, and transfers the OSC to which the packet density information thereon has been assigned, to the optical packet in-line amplifier apparatus 80. The OSC generated by the OSC generator 82 is multiplexed with the optical packet signal by the optical coupler 84 and then outputted to an optical transmission path.

As shown in FIG. 8, the optical packet in-line amplifier apparatus 80 includes optical couplers 86 and 92, a relaying optical amplifier 88, a relaying variable optical attenuator 90, an optical supervisory channel (OSC) receiver 94, a relaying control unit 96, an optical supervisory channel (OSC) generator 98, and a relay storage 99.

The optical packet signal inputted to the optical packet in-line amplifier apparatus 80 via the optical transmission path is inputted to the optical coupler 86. The optical coupler 86 bifurcates the signal into the optical packet signal and the optical supervisory channel (OSC). One of the bifurcated optical packet signals is amplified by the relaying optical amplifier 88 and then inputted to the relaying variable optical attenuator 90. The relaying optical amplifier 88 may be the EDFA or SOA.

On the other hand, the other of the bifurcated optical packet signals is received by the OSC receiver 94. The OSC receiver 94 extracts packet density information from the received optical supervisory channel and then outputs the thus extracted information to the relaying control unit 96. The relay storage 99 stores gain characteristics relative to the packet density belonging to the relaying optical amplifier 88.

The relaying control unit 96 controls the attenuation of the relaying variable optical attenuator 90 in such a manner as to compensate for the gain variation due to the packet density variation at the relaying optical amplifier 88, based on the packet density information fed from the OSC receiver 94 and the gain characteristics stored in the relay storage 99.

The packet density information extracted by the OSC receiver 94 is transferred to the OSC generator 98. The OSC generator 98 assigns the received packet density information to a predetermined field of the OSC, and transfers the OSC to which the packet density information thereon has been assigned, to the subsequent optical packet in-line amplifier apparatus.

The optical packet signal outputted from the relaying variable optical attenuator 90 and the OSC supplied from the OSC generator 98 are multiplexed by the optical coupler 92 and the thus multiplexed signal is outputted to the optical transmission path.

As described above, by employing the optical packet switching system 100 according to the fourth embodiment, the optical packet in-line amplifier apparatus 80 can compensate for the gain variation due to the packet density variation. Thereby, the peak power of the optical packet signals outputted from the optical packet in-line amplifier apparatus 80 can be stabilized without regard to the packet density.

Also, by employing the fourth embodiment, the optical packet in-line amplifier apparatus 80 can transfer the received packet density information to the subsequent optical packet in-line amplifier apparatus. The optical packet switching system 100 of FIG. 7 shows the structure where the optical packet in-line amplifier apparatus is of one stage. However, by employing the structure as in the fourth embodiment where the received packet density information is directly transferred again to the subsequent optical packet in-line amplifier apparatus, the gain variation due to the packet density variation can be compensated even though the optical packet in-line amplifier apparatus having a plurality of stages is connected. For example, a variation of 1 dB per one stage of the optical packet in-line amplifier apparatus will grow to a large gain variation of 10 dB after a passage through ten stages of the optical packet in-line amplifier apparatus. The fourth embodiment can avoid or suppress such a large gain variation Since the packet density information is a signal lasting about several milliseconds in the fourth embodiment, it can be completely kept track of if it is an OSC whose speed is about 10 Mbps or greater.

Though, in the optical packet switching system 100 according to the fourth embodiment, the optical packet switching apparatus shown in FIG. 2 is used as an optical packet switching apparatus, the optical packet switching apparatus shown in FIG. 4 and FIG. 6 may also be used.

In the fourth embodiment, the relaying control unit 96 is so configured as to control the attenuation of the relaying variable optical attenuator 90. However, the preferred embodiments are not limited thereto. For example, the EDFA may be used as the relaying optical amplifier 88 of the optical packet in-line amplifier apparatus 80, and the relay control unit 96 may control the excitation light power of the EDFA so that the gain of the EDFA can be constant, based on the packet density and the gain characteristics. In this case, the variable optical attenuator 90 is no longer required, so that cost can be reduced.

Also, the SOA may be used as the relaying optical amplifier 88 of the optical packet in-line amplifier apparatus 80, and the relaying control unit 96 may control the drive current, based on the packet density and the gain characteristics, in such a manner that the gain of the SOA is constant. In this case, too, the variable optical attenuator 90 is no longer required, so that cost can be reduced.

Also, the EDFA may be used as the relaying optical amplifier 88 of the optical packet in-line amplifier apparatus 80, and the relay storage 99 may store the gain characteristics relative to the packet density belonging to the EDFA and the wavelength dependent gain relative to the packet density belonging to the EDFA. Then, the relaying control unit 96 controls the power of the excitation light in such a manner as to compensate for the gain variation due to the packet density variation at the EDFA, based on the packet density and the wavelength dependent gain, and controls the attenuation of the relaying variable optical attenuator in such a manner as to compensate for the gain variation due to the packet density variation at the EDFA, based on the packet density and the gain characteristics. In this case, both the wavelength dependent gain and the gain characteristics in the EDFA can be stabilized even though the packet density varies. Thus, a highly qualified optical packet switching function can be provided.

The present invention has been described based upon illustrative embodiments. The above-described embodiments are intended to be illustrative only and it will be obvious to those skilled in the art that various modifications to the combination of constituting elements and processes could be further developed and that such modifications are also within the scope of the present invention.

In the above-described embodiments, the optical packet switching apparatus is provided with the optical amplifiers both at the input side and the output side of the optical switch but this should not be considered as limiting. For example, the optical amplifiers may be provided either at the input side only or at the output side only of the optical packet switching apparatus. Also, the optical amplifier may not be provided on all of the input ports and the output ports.

What is claimed is:

1. An optical packet switching apparatus, comprising:
   an optical packet switch configured to switch a route of an inputted optical packet signal and output the inputted optical packet signal;
   a packet density monitoring unit configured to detect a packet density of the optical packet signal inputted to the optical packet switch and/or a packet density of an optical packet signal outputted from the optical packet switch, the packet density being a ratio of a period of time occupied by the optical packet signal in a unit packet interval time;
   an optical amplifier provided on an input side and/or an output side of the optical packet switch;
   a variable optical attenuator provided anterior to or posterior to the optical amplifier;
   a storage configured to store gain characteristics in relation to the packet density at the optical amplifier; and
   a control unit configured to control an attenuation by the variable optical attenuator in such a manner as to compensate for gain fluctuation due to variation in the packet density at the optical amplifier, based on the packet density and the gain characteristics.

2. The optical packet switching apparatus according to claim 1, wherein the optical amplifier and the variable optical attenuator are provided for each input port and/or each output port of the optical packet switching apparatus,
   wherein the packet density monitoring unit is configured to detect the packet density for each input port and/or each output port thereof, and
   wherein the control unit is configured to control the attenuation by the variable optical attenuator for each input port and/or each output port thereof.

3. The optical packet switching apparatus according to claim 1, wherein the packet density monitoring unit is configured to calculate the packet density based on a cumulative number of packet byte count of inputs and/or outputs and a period of time occupied by the optical packet signal.

4. The optical packet switching apparatus according to claim 1, wherein the optical amplifier is an erbium doped fiber amplifier (EDFA), and an excitation light power of the EDFA is set to a constant value.

5. The optical packet switching apparatus according to claim 1, wherein the optical amplifier is a semiconductor optical amplifier, and a drive current of the semiconductor optical amplifier is set to a constant value.

6. An optical packet switching apparatus, comprising:
   an optical packet switch configured to switch a route of an inputted optical packet signal and output the inputted optical packet signal;
   a packet density monitoring unit configured to detect a packet density of the optical packet signal inputted to the optical packet switch and/or a packet density of an optical packet signal outputted from the optical packet switch, the packet density being a ratio of a period of time occupied by the optical packet signal in a unit packet interval time;
   an erbium doped fiber amplifier (EDFA) provided on an input side and/or an output side of the optical packet switch;
   a storage configured to store gain characteristics in relation to the packet density at the EDFA; and
   a control unit configured to control an excitation light power, based on the packet density and the gain characteristics, in such a manner that a gain of the EDFA is constant.

7. An optical packet switching apparatus, comprising:
   an optical packet switch configured to switch a route of an inputted optical packet signal and output the inputted optical packet signal;
   a packet density monitoring unit configured to detect a packet density of the optical packet signal inputted to the optical packet switch and/or a packet density of an optical packet signal outputted from the optical packet switch, the packet density being a ratio of a period of time occupied by the optical packet signal in a unit packet interval time;
   a semiconductor optical amplifier provided on an input side and/or an output side of the optical packet switch;
   a storage configured to store gain characteristics in relation to the packet density at the semiconductor optical amplifier; and
   a control unit configured to control a drive current, based on the packet density and the gain characteristics, in such a manner that a gain of the semiconductor optical amplifier is constant.

8. An optical packet switching apparatus, comprising:
an optical packet switch configured to switch a route of an inputted optical packet signal and output the inputted optical packet signal;
a packet density monitoring unit configured to detect a packet density of the optical packet signal inputted to the optical packet switch and/or a packet density of an optical packet signal outputted from the optical packet switch, the packet density being a ratio of a period of time occupied by the optical packet signal in a unit packet interval time;
an erbium doped fiber amplifier (EDFA) provided on an input side and/or an output side of the optical packet switch;
a variable optical attenuator provided anterior to or posterior to the EDFA;
a storage configured to store gain characteristics in relation to the packet density at the EDFA and configured to store wavelength dependent gain relative to the packet density; and
a control unit configured to control an excitation light power in such a manner as to compensate for wavelength dependent gain variation due to variation in the packet density at the EDFA, based on the packet density and the wavelength dependent gain, and configured to control an attenuation by the variable optical attenuator in such a manner as to compensate for gain fluctuation due to variation in the packet density at the EDFA, based on the packet density and the gain characteristics.

9. An optical packet switching system comprising: the optical packet switching apparatus according to claim 1; and an optical packet in-line amplifier apparatus for relaying and amplifying an optical packet signal inputted from the optical packet switching apparatus,
the optical packet switching apparatus further including a transfer unit configured to transfer the packet density detected by the packet density monitoring unit, to the optical packet in-line amplifier apparatus,
the optical packet in-line amplifier apparatus including:
a relaying optical amplifier configured to amplify the inputted optical packet signal;
a relaying variable optical attenuator provided anterior to or posterior to the relaying optical amplifier;
a relay storage configured to store gain characteristics in relation to the packet density at the relaying optical amplifier; and
a relay control unit configured to control an attenuation by the relaying variable optical attenuator in such a manner as to compensate for gain fluctuation due to variation in the packet density at the relaying optical amplifier, based on the packet density and the gain characteristics fed from the optical packet switching apparatus.

10. The optical packet switching system according to claim 9, wherein the transfer unit is configured to transfer information on the packet density, using an optical supervisory channel (OSC) which is a signal having a wavelength different from the wavelength used for the optical packet signal.

11. The optical packet switching system, according to claim 9, including a plurality of the optical packet in-line amplifier apparatuses,
wherein each of the optical packet switching apparatuses further includes a transfer unit configured to transfer a received information on the packet density to an optical packet switching apparatus provided posterior thereto.

12. An optical packet switching system comprising: the optical packet switching apparatus according to claim 1; and an optical packet in-line amplifier apparatus for relaying and amplifying an optical packet signal inputted from the optical packet switching apparatus,
the optical packet switching apparatus further including a transfer unit configured to transfer information on the packet density detected by the packet density monitoring unit, to the optical packet in-line amplifier apparatus,
the optical packet in-line amplifier apparatus including:
a relaying EDFA (erbium doped fiber amplifier) configured to amplify the inputted optical packet signal;
a relay storage configured to store gain characteristics in relation to the packet density at the relaying EDFA; and
a relay control unit configured to control an excitation light power, based on the packet density and the gain characteristics fed from the optical packet switching apparatus, in such a manner that a gain of the relaying EDFA is constant.

13. An optical packet switching system comprising the optical packet switching apparatus according to claim 1 and an optical packet in-line amplifier apparatus for relaying and amplifying an optical packet signal inputted from the optical packet switching apparatus,
the optical packet switching apparatus further including a transfer unit configured to transfer information on the packet density detected by the packet density monitoring unit, to the optical packet in-line amplifier apparatus;
the optical packet in-line amplifier apparatus including:
a relaying semiconductor optical amplifier configured to amplify the inputted optical packet signal;
a relay storage configured to store gain characteristics in relation to the packet density at the relaying semiconductor optical amplifier; and
a relay control unit configured to control a drive current, based on the packet density and the gain characteristics fed from the optical packet switching apparatus, in such a manner that a gain of the relaying semiconductor optical amplifier is constant.

14. An optical packet switching system comprising: the optical packet switching apparatus according to claim 1; and an optical packet in-line amplifier apparatus for relaying and amplifying an optical packet signal inputted from the optical packet switching apparatus,
the optical packet switching apparatus further including a transfer unit configured to transfer information on the packet density detected by the packet density monitoring unit, to the optical packet in-line amplifier apparatus,
the optical packet in-line amplifier apparatus including:
a relaying EDFA (erbium doped fiber amplifier) configured to amplify the inputted optical packet signal;
a relaying variable optical attenuator provided anterior to or posterior to the relaying EDFA;
a relay storage configured to store gain characteristics in relation to the packet density at the relaying EDFA and configured to store wavelength dependent gain relative to the packet density; and
a relay control unit configured to control an excitation light power in such a manner as to compensate for wavelength dependent gain variation due to variation in the packet density at the EDFA, based on the packet density and the wavelength dependent gain, and configured to control an attenuation by the relaying variable optical attenuator in such a manner as to compensate for gain fluctuation due to variation in the packet density at the relaying EDFA, based on the packet density and the gain characteristics.

15. An optical packet in-line amplifier apparatus for relaying and amplifying an optical packet signal inputted from an optical packet switching apparatus, the optical packet in-line amplifier apparatus comprising:
   a relaying optical amplifier configured to amplify the inputted optical packet signal;
   a relaying variable optical attenuator provided anterior to or posterior to the relaying optical amplifier;
   a relay storage configured to store gain characteristics in relation to a packet density at the relaying optical amplifier, the packet density being a ratio of a period of time occupied by the optical packet signal in a unit packet interval time;
   a receiver configured to receive information on the packet density from the optical packet switching apparatus; and
   a relay control unit configured to control an attenuation by the relaying variable optical attenuator in such a manner as to compensate for gain fluctuation due to variation in the packet density at the relaying optical amplifier, based on the packet density and the gain characteristics.

16. The optical packet in-line amplifier apparatus according to claim 15, further comprising a transfer unit configured to transfer the received information on the packet density to an optical packet in-line amplifier apparatus provided posterior thereto.

17. An optical packet in-line amplifier apparatus for relaying and amplifying an optical packet signal inputted from an optical packet switching apparatus, the optical packet in-line amplifier apparatus comprising:
   a relaying EDFA (erbium doped fiber amplifier) configured to amplify the inputted optical packet signal;
   a relay storage configured to store gain characteristics in relation to a packet density at the relaying EDFA, the packet density being a ratio of a period of time occupied by the optical packet signal in a unit packet interval time;
   a receiver configured to receive information on the packet density from the optical packet switching apparatus; and
   a relay control unit configured to control an excitation light power, based on the packet density and the gain characteristics, in such a manner that a gain of the relaying EDFA is constant.

18. An optical packet in-line amplifier apparatus for relaying and amplifying an optical packet signal inputted from an optical packet switching apparatus, the optical packet in-line amplifier apparatus comprising:
   a relaying semiconductor optical amplifier configured to amplify the inputted optical packet signal;
   a relay storage configured to store gain characteristics in relation to a packet density at the relaying semiconductor optical amplifier, the packet density being a ratio of a period of time occupied by the optical packet signal in a unit packet interval time;
   a receiver configured to receive information on the packet density from the optical packet switching apparatus; and
   a relay control unit configured to control a drive current, based on the packet density and the gain characteristics, in such a manner that a gain of the relaying semiconductor optical amplifier is constant.

19. An optical packet in-line amplifier apparatus for relaying and amplifying an optical packet signal inputted from an optical packet switching apparatus, the optical packet in-line amplifier apparatus comprising:
   a relaying EDFA (erbium doped fiber amplifier) configured to amplify the inputted optical packet signal;
   a relaying variable optical attenuator provided anterior to or posterior to the relaying EDFA, the packet density being a ratio of a period of time occupied by the optical packet signal in a unit packet interval time;
   a relay storage configured to store gain characteristics in relation to a packet density at the relaying EDFA;
   a receiver configured to receive information on the packet density from the optical packet switching apparatus; and
   a relay control unit configured to control an excitation light power in such a manner as to compensate for wavelength dependent gain variation due to variation in the packet density at the relaying EDFA, based on the packet density and the wavelength dependent gain, and configured to control an attenuation by the relaying variable optical attenuator in such a manner as to compensate for gain fluctuation due to variation in the packet density at the relaying EDFA, based on the packet density and the gain characteristics.

20. The optical packet switching apparatus according to claim 1, further comprising:
   a counter configured to count a cumulative number of packet bytes of the optical packet signal inputted to an input port of the optical packet switching apparatus and/or outputted from an output port of the optical packet switching apparatus over a predetermined period of retention time,
   wherein the packet density monitoring unit is configured to calculate the packet density according to a following expression:

packet density=accumulated number of bytes[bytes]/ (retention time [$s$]×bit rate[bits/$s$]/8).

* * * * *